United States Patent [19]

Franke

[11] Patent Number: 5,350,050

[45] Date of Patent: Sep. 27, 1994

[54] CONTINUOUS VERTICAL CONVEYOR

[75] Inventor: Walter K. Franke, Fremont, Calif.

[73] Assignee: Donald L. Collver, San Jose, Calif.; a part interest

[21] Appl. No.: 119,517

[22] Filed: Sep. 9, 1993

[51] Int. Cl.⁵ .............................................. B65G 1/00
[52] U.S. Cl. ................................ 198/347.1; 198/801; 414/280
[58] Field of Search ................. 198/347.1, 347.4, 435, 198/801, 468.9, 468.11, 463.3; 414/280, 331

[56] References Cited

U.S. PATENT DOCUMENTS

| | | | |
|---|---|---|---|
| 3,492,704 | 2/1970 | Schwellenbach | 414/280 X |
| 3,921,826 | 11/1975 | Rice et al. | 198/801 X |
| 4,579,499 | 4/1986 | Mikes | 414/280 X |
| 4,995,769 | 2/1991 | Berger et al. | 198/347.1 X |
| 4,998,857 | 3/1991 | Paravella et al. | 414/280 X |
| 5,056,978 | 10/1991 | Grafe et al. | 414/280 |
| 5,088,588 | 2/1992 | Davis et al. | 198/801 X |
| 5,195,687 | 3/1993 | Derichs et al. | 414/331 X |
| 5,253,743 | 10/1993 | Haas, Sr. et al. | 198/347.1 |

FOREIGN PATENT DOCUMENTS

| | | | |
|---|---|---|---|
| 0114907 | 6/1986 | Japan | 198/347.4 |
| 0157123 | 7/1987 | Japan | 198/347.1 |

Primary Examiner—James R. Bidwell
Attorney, Agent, or Firm—Bruce H. Johnsonbaugh

[57] ABSTRACT

A chain drive continuous vertical conveyor is provided wherein multiple slats carried by multiple pairs of chain cooperate to form multi-sectional elevator surfaces. The elevator surfaces are capable of lifting wide and heavy loads. A live storage accumulator is also provided including multiple horizontal live storage levels which are stacked vertically. Each of the live storage levels includes a low profile belt conveyor. Containers may be transferred from a vertical conveyor to the accumulator and from the accumulator to another vertical conveyor.

9 Claims, 5 Drawing Sheets

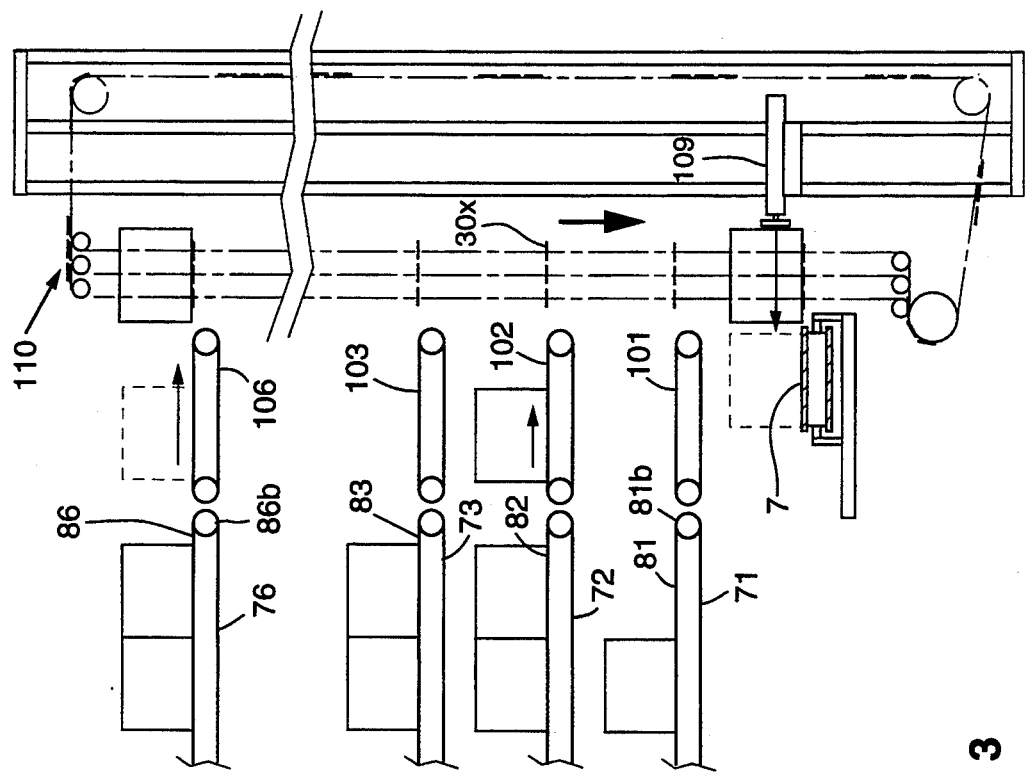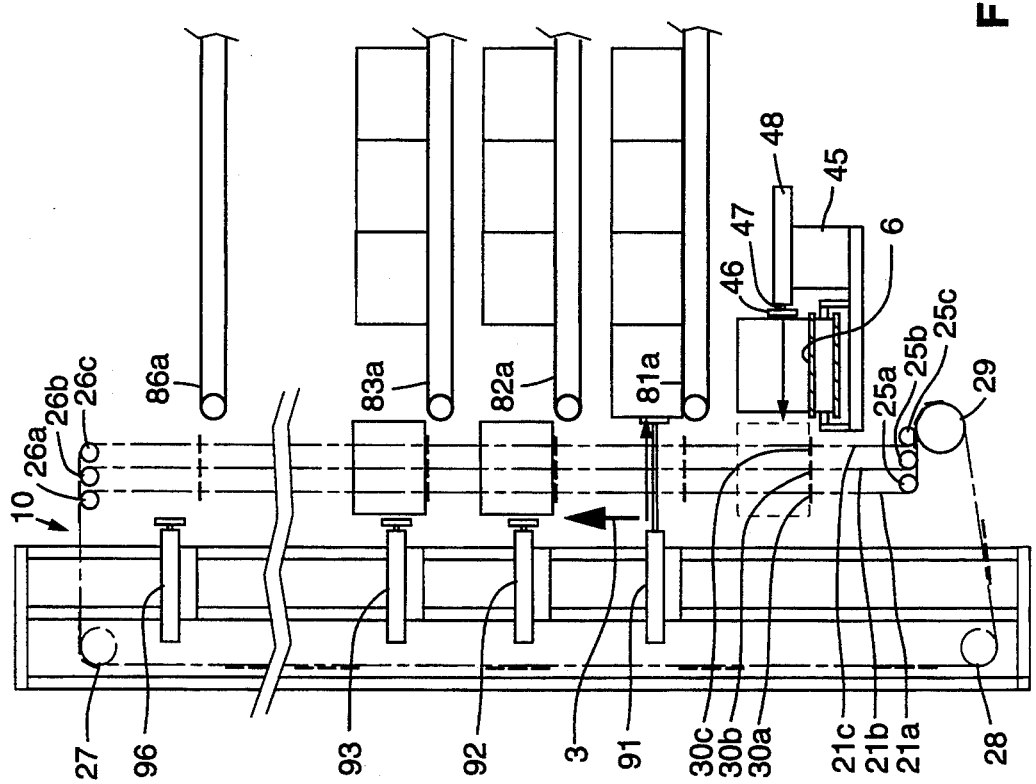
FIG. 3

CONTINUOUS VERTICAL CONVEYOR

BRIEF SUMMARY OF THE INVENTION

This invention relates in general to conveyors and, in particular, to a chain driven continuous vertical conveyor. The present invention provides multiple slats carried by multiple pairs of chains wherein the slats cooperate to form a multi-sectional elevator surface.

The prior art includes continuous chain conveyors such as the Franke U.S. Pat. No. 4,627,530 dated Dec. 9, 1986 which teaches a conveyor for making horizontal and vertical runs wherein a continuous surface is provided on horizontal runs. In contrast, the present invention provides a vertical conveyor having multi-sectional elevator surfaces capable of lifting relatively wide and relatively heavy loads, as well as carrying loads downwardly.

In accordance with the present invention, a live storage accumulator is provided which can be utilized in conjunction with two vertical conveyors. One of the vertical conveyors loads the accumulator and a second continuous vertical conveyor is used to unload the accumulator. The accumulator includes multiple horizontal live storage levels which are stacked vertically. Containers stored in the accumulator may be unloaded independently of the loading function.

The continuous vertical conveyor of the present invention is able to lift relatively wide and heavy loads by utilizing multiple slats wherein each slat is attached at each end to a continuous length of roller chain. Since each of the multiple slats making up a single elevator surface is carried by a separate pair of chains, relatively wide and relatively heavy items may be moved upwardly and downwardly.

Accordingly, a primary object of the invention is to provide a continuous vertical conveyor wherein relatively wide and relatively heavy loads may be lifted vertically upwardly or downwardly.

Another object of the invention is to provide a live storage accumulator used in conjunction with two or more continuous vertical conveyors wherein the accumulator may be unloaded separately and independently from being loaded.

A further object of the invention is to provide a continuous vertical conveyor wherein the elevator surface is made up of multiple slats that are connected to separate pairs of roller chain and the elevator surface may be used to move containers upwardly or downwardly.

Other objects and advantages of the invention will become apparent from the drawings wherein:

BRIEF DESCRIPTION OF THE DRAWINGS

FIG. 3 is a side elevational view of the live storage accumulator and conveyors of FIG. 1;

FIG. 6 is a section on the line 6-6 of FIG. 5.

DETAILED DESCRIPTION OF THE DRAWINGS

Figure 1:
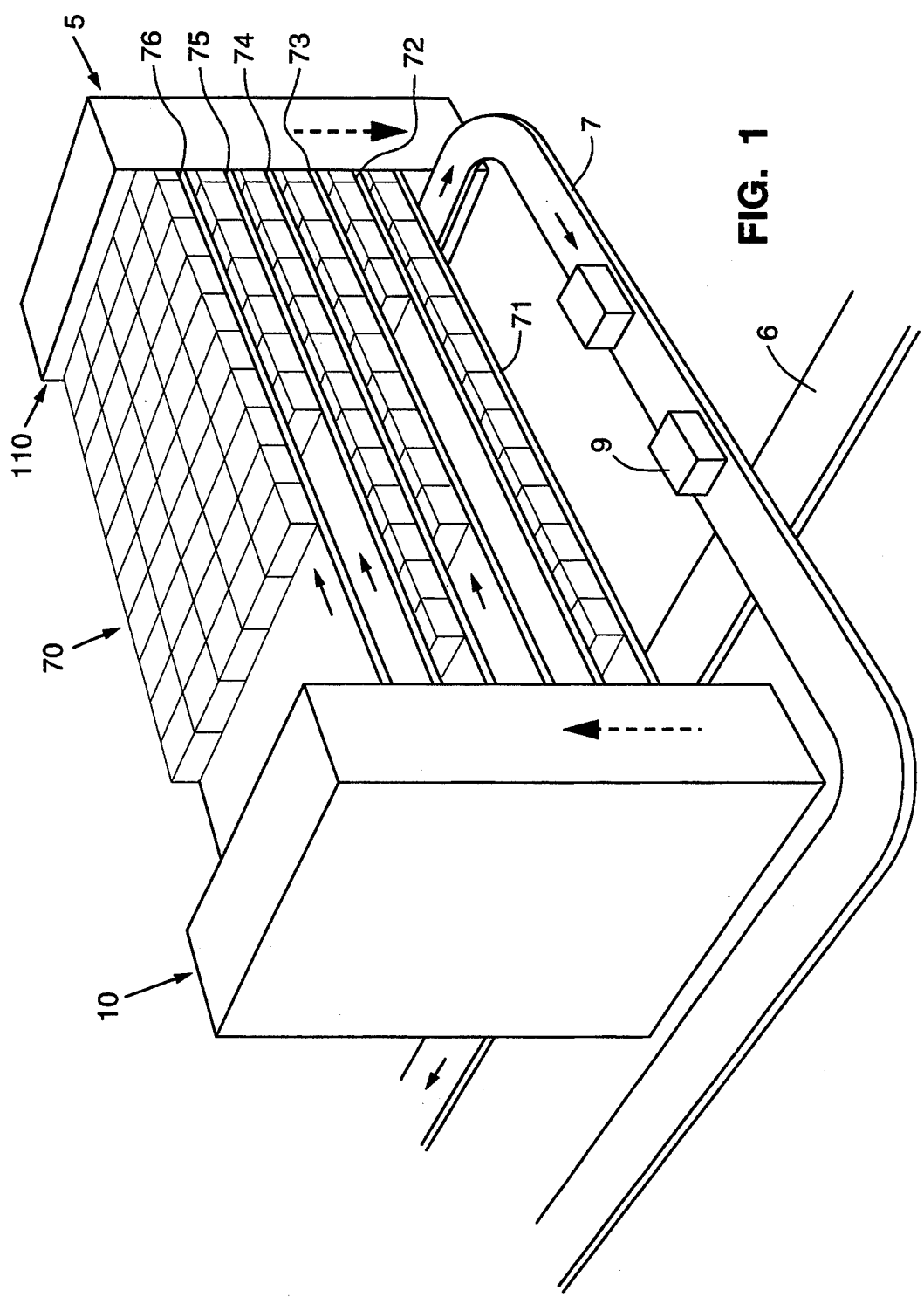
FIG. 1 is a perspective view of a live storage accumulator used in conjunction with two continuous vertical conveyors.

FIG. 1 shows in perspective view a live storage mechanism shown generally as 5 which includes a first continuous vertical conveyor 10 and a second vertical conveyor 110. A storage accumulator shown generally as 70 includes multiple live storage levels stacked vertically and positioned between conveyors 10 and 110. Conveyor 10 is used to lift containers 9 off of incoming conveyor 6. Conveyor 10 lifts the containers and loads the containers onto the live storage levels of accumulator 70. The second continuous vertical conveyor 110 is used to unload containers from accumulator 70 as needed and to transfer those containers onto a takeaway conveyor 7.

Figure 2:
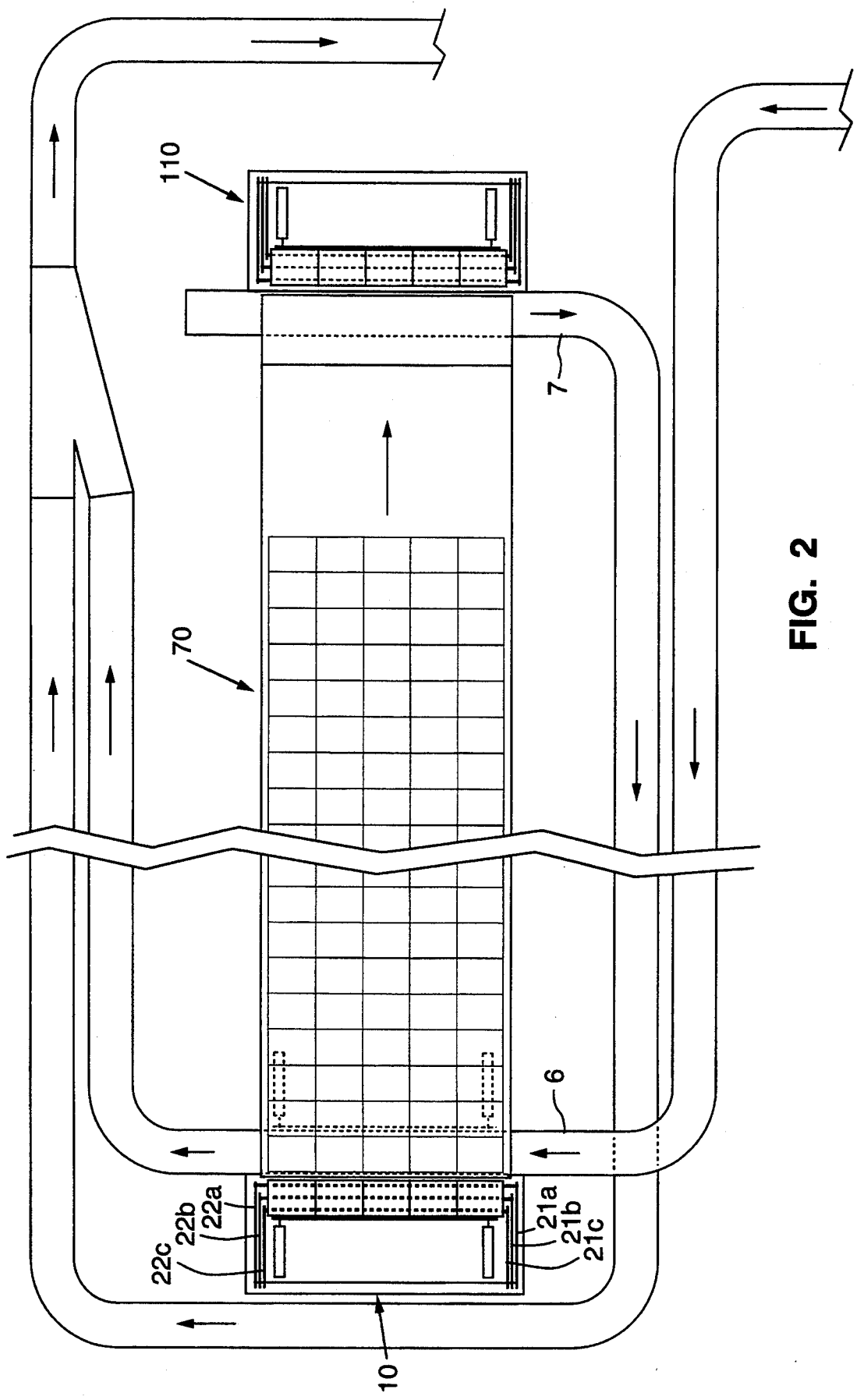
FIG. 2 is a top elevational view showing one level of the accumulator and conveyors of FIG. 1.
Figure 4:
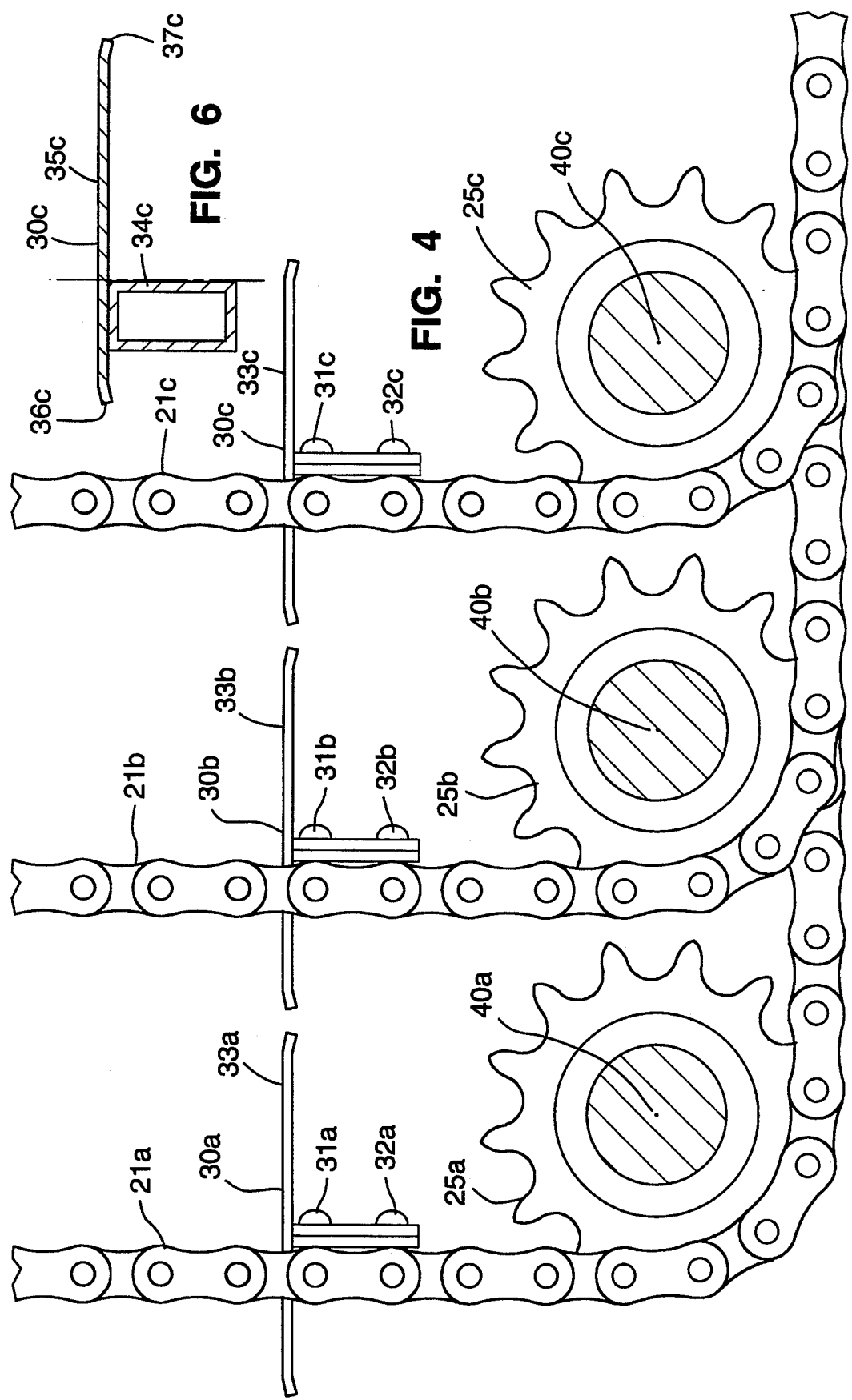
FIG. 4 is a side elevational view, partially in section, showing a portion of the continuous vertical conveyor according to the present invention.
Figure 5:
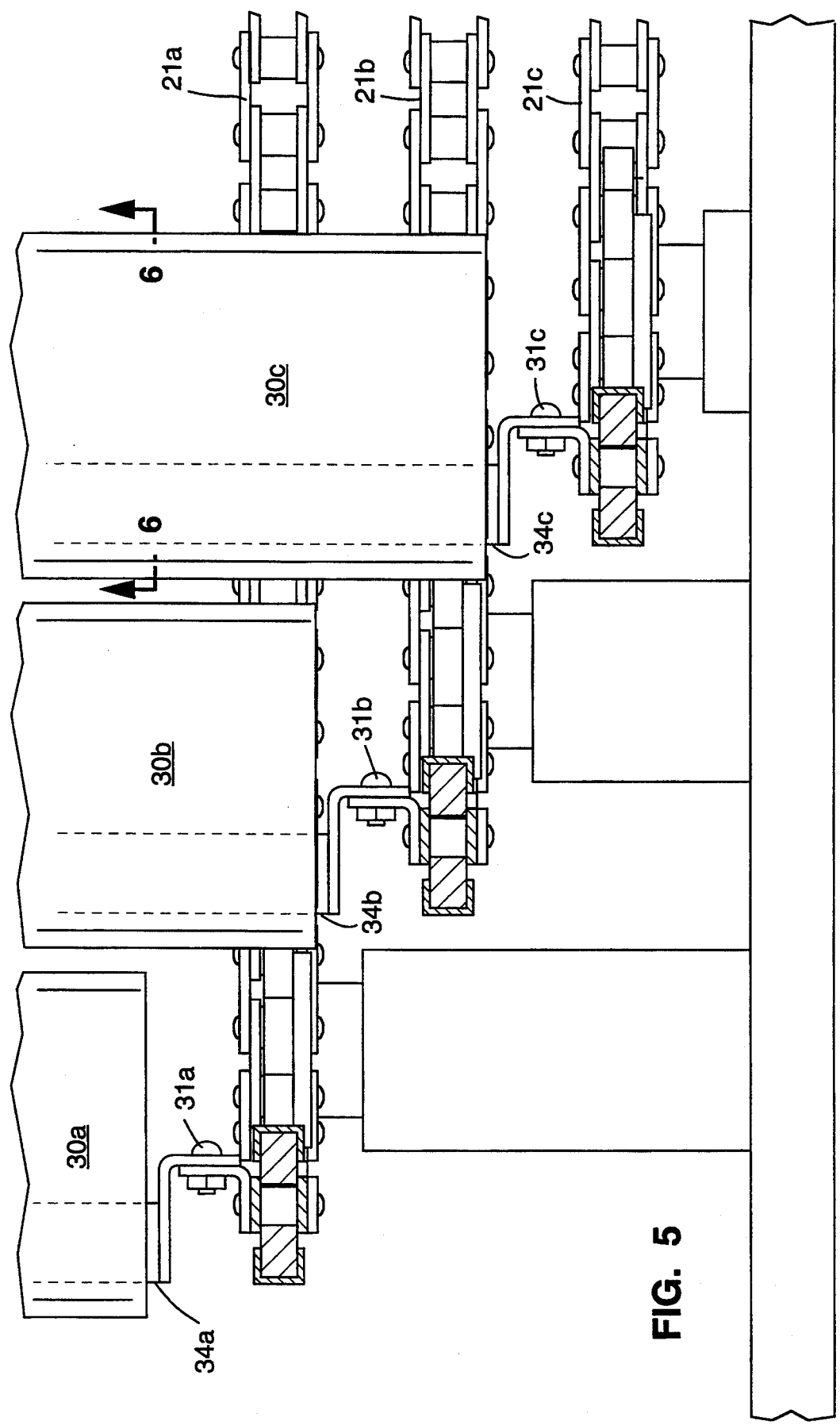
FIG. 5 is a top plan view of that portion of the conveyor shown in FIG. 4.

Referring to FIGS. 2–4, three pairs of continuous lengths of roller chain 21a, 22a, 21b, 22b, 21c and 22c are provided. Chain 21a forms a pair with chain 22a. Chains 21a and 22a move in parallel paths and carry at least one slat 30a (FIG. 4) therebetween. Chain 21a travels in the continuous path shown in FIG. 3. A pair of drive sprockets carry, guide and drive each of the three pairs of chains. Although each chain may be carried by multiple sprockets, I have found that the use of one sprocket per chain is preferred. That sprocket is the drive sprocket, and the remainder of each chain is guided and carried by drums or shoes. I have also found that it is beneficial to mount all drive sprockets on a common shaft. In FIG. 3, all six drive sprockets are carried on a common shaft shown as 27. Chain 21a is carried, guided and driven by drive sprocket 27. Guiding drum or shoe 26a is positioned vertically above urethane idler drum or shoe 25a. Two common drums 28 and 29 carry all three chains 21a, 21b and 21c.

As shown best in FIG. 3, chain 21b is guided and carried through its vertical lifting run by lower urethane idler drum or shoe 25b and upper guiding shoe 26b. Chain 21b is also carried by common drums 28 and 29. Similarly, chain 21c is carried and guided through its vertical lifting run by lower idler drum or shoe 25c and upper guiding drum or shoe 26c and is carried throughout the rest of its path by common drums 28 and 29 and drive sprocket 27.

As shown best in FIG. 4, each pair of chains carries at least one slat such as 30a, 30b and 30c. Slat 30a is carried between chains 21a and 22a. One end of slat 30a is connected to chain 21a by bolts 31a and 32a. Slats 30b and 30c are connected in similar fashion to chains 21b and 21c. FIG. 4 shows the use of idler sprockets 25a, 25b and 25c; but it is understood that idler drums or shoes are preferable to idler sprockets.

Slats 30a, 30b and 30c have generally flat upper surfaces 33a, 33b and 33c which cooperate to form a generally planar, horizontal and multi-sectional elevator surface capable of lifting relatively heavy and relatively wide loads. For example, in the embodiment shown in the drawings, the slats are approximately eleven feet in length and are approximately four inches wide. The elevator surface formed by slats 30a, 30b and 30c is capable of lifting a load of 300 pounds having a width of ten feet. As shown best in FIG. 6, slat 30c includes a rectangular tube 34c which extends the entire length of the slat and a generally flat sheet metal top 35c which is bent downwardly along each of its longitudinal edges 36c and 37c.

Slats 30a, 30b and 30c are synchronized by mounting all six drive sprockets on a common shaft 27 and by the rotation of the drive sprockets at uniform rpm's in order to bring slats 30a, 30b and 30c into horizontal alignment as shown in FIG. 4 when those slats are moving in the upward direction. The synchronization is also facilitated by the use of chains having the same length, which is accomplished by displacing the axes of rotation 40a, 40b and 40c (FIG. 4) of lower idler sprockets a given horizontal distance in one direction and by displacing the axes of rotation of upper idler sprockets or drums 26a, 26b and 26c that same given distance in the opposite direction (FIG. 3). As shown best in FIG. 3, slats 30a, 30b and 30c are aligned to form a planar, horizontal and multi-sectional elevator surface for movement in the vertical direction shown by arrow 3.

As used herein and in the claims, the phrase "synchronizing means" includes the horizontal spacing of the shoes or sprockets 25a, 25b and 25c and guiding drums 26a, 26b and 26c as well as the use of the same size chain and sprockets for supporting each of the three pairs of chains shown in FIGS. 3 and 4 as well as the use of a drive system which rotates the drive sprockets at a uniform rpm.

As shown best in FIG. 3, a pusher 45 is provided for pushing a container off of incoming conveyor 6 onto the elevator surface formed by slats 30a, 30b and 30c. Pusher 45 includes a horizontal bar 46 which contacts the containers. Bar 46 is carried at each end by two rods 47 carried within two cylinders 48.

The accumulator 70 may have any desired number of live storage levels. The embodiment shown in FIG. 1 includes six live storage levels 71–76. Each level includes a horizontal, low profile belt conveyor 81–86. Each of the conveyors 81–86 is a wide plastic positive driven belting such as "Intralox" ® belting. Each of the low profile belt conveyors 81–86 is spaced apart vertically an equal distance which leaves adequate clearance for the containers. Each pair of chains carries multiple slats throughout the length of chain, and the slats are spaced apart on their carrying chains the same distance by which the belt conveyors 81–86 are spaced so that, when the conveyor stops at the position shown in FIG. 3, the containers carried by the elevator 10 are aligned with the multiple slats and with the surfaces of conveyors 81–86.

Each of the belt conveyors 81–86 has a receiving end 81a–86a, respectively, and discharge ends 81b–86b, respectively. Each of the belt conveyors 81–86 is positioned in vertical alignment with their respective receiving ends aligned vertically and their respective discharge ends aligned vertically.

Pushers 91–96 are carried by conveyor 10 adjacent each of storage levels 71–76 for pushing containers off the elevator surfaces onto one of the belt conveyors 81–86.

Each storage level 71–76 also includes a two speed unloading conveyor 101–106. Each of the unloading conveyors 101–106 is aligned horizontally with low profile belt conveyors 81–86. The unloading conveyors 101–106 will operate at low speed to receive one row of containers, as shown by conveyor 102 in FIG. 3. When it is desired to transfer the row of containers from conveyor 102 to vertical conveyor 110, vertical conveyor 110 is stopped at the position shown in FIG. 3, unloading conveyor 102 is driven at its high speed and a container is transferred from its position shown in FIG. 3 onto the elevator surface referenced as 30x in FIG. 3. A pusher 109 is located at the lower portion of vertical conveyor 110 to unload rows of cases onto discharge conveyor 7.

It is understood that the continuous vertical elevators 10 and 110 may utilize any number of slats to make up an elevator surface. The preferred embodiment utilizes three slats to form each individual elevating surface, as shown in the drawings. It is also understood that any number of live storage levels could be utilized in the accumulator 70.

I claim:

1. A continuous vertical conveyor comprising:
   first and second pairs of continuous lengths of roller chain,
   at least one pair of drive sprockets carrying, guiding and driving each of said pairs of chain in a single direction continuously,
   each of said first and second pairs of chain moving in parallel paths and each pair carrying at least one slat means extending therebetween,
   each of said slat means forming a generally horizontal surface when said pair of roller chains is moving in a vertical direction, and
   synchronizing means for aligning two or more of said slat means carried by said first and second pairs of chain to form a generally planar, horizontal, multi-sectional elevator surface wherein two slats are adjacent each other when said first and second pairs of chain are moving in a vertical direction.

2. The apparatus of claim 1 wherein each of said chains has the same length, each of said chains is carried vertically by an upper and lower sprocket or drum, and wherein said upper sprockets or drums carrying said first pair of chains are displaced horizontally a given distance in one direction from said upper sprockets or drums carrying said second pair of chains and said lower sprockets or drums carrying said first pair of chains are displaced horizontally said same given distance in an opposite direction from said upper sprockets or drums carrying said second pair of chains.

3. The apparatus of claim 1 wherein each of said pairs of chain carries multiple slats, said slats being equally spaced apart along the entire length of said chain.

4. The apparatus of claim 3 wherein each of said slat means comprises a rectangular tubular member extending lengthwise and a generally flat, metallic top portion carried by said rectangular member.

5. The apparatus of claim 4 further comprising a third pair of continuous length of roller chain and wherein each of said slat means is at least ten feet long, and wherein three slats together form an elevator surface capable of lifting three hundred pounds.

6. In combination, first and second continuous vertical conveyors and a storage accumulator, wherein each vertical conveyor comprises:
   first and second pairs of continuous lengths of roller chain,
   first and second pairs of sprockets carrying and guiding said pairs of chain in a single direction continuously,
   each of said first and second pairs of chain moving in parallel paths and each pair carrying at least one slat means extending therebetween,
   each of said slat means forming a generally horizontal surface when said pair of roller chains is moving in a vertical direction,
   synchronizing means for aligning two or more of said slat means carried by said first and second pairs of chain to form a generally planar, horizontal, multi-sectional elevator surface wherein two slats are adjacent each other when said first and second pairs of chain are moving in a vertical direction, and wherein said accumulator comprises:

multiple live storage levels wherein each level comprises a horizontal, low profile belt conveyor, each belt conveyor having a receiving end and a discharge end, each of said belt conveyors being positioned in vertical alignment, pusher means carried by said first continuous vertical conveyor adjacent each of said storage levels for pushing containers off said elevator surface onto one of said belt conveyors, and unloading means for transferring containers from one of said belt conveyors to said second continuous vertical conveyor.

7. The apparatus of claim 6 wherein each of said pairs of chain carries multiple slats, said slats being equally spaced apart along the entire length of said chain, and wherein each of said live storage levels of said accumulator are spaced equally apart a distance which is the same as the distance between said slats.

8. The apparatus of claim 6 wherein said unloading means comprises two speed unloading conveyors at each of said live storage levels, each of said unloading conveyors being aligned horizontally with one of said low profile belt conveyors and being located adjacent the discharge end of said low profile belt conveyors.

9. A live storage accumulator for storing containers temporarily, comprising:

multiple live storage levels wherein each level comprises a horizontal, low profile belt conveyor, each belt conveyor having a receiving end and a discharge end, each of said belt conveyors being positioned in vertical alignment, pusher means mounted adjacent said receiving end of each of said low profile belt conveyors for pushing containers onto each of said low profile belt conveyors, unloading means for transferring containers from one or more of said low profile belt conveyors, said unloading means being located adjacent the discharge end of each low profile belt conveyor, and a two speed unloading conveyor means located on each of said levels between said low profile belt conveyor and said unloading means, said unloading conveyor means having a low speed for transferring a row of containers onto it from said low profile belt conveyor and a high speed for transferring a row of containers from it to said unloading means.

* * * * *